US008650057B2

(12) United States Patent  
Webster

(10) Patent No.: US 8,650,057 B2  
(45) Date of Patent: Feb. 11, 2014

(54) INTEGRATED ENERGY MERCHANT VALUE CHAIN

(75) Inventor: Andrew S Webster, Pearland, TX (US)

(73) Assignee: Accenture Global Services GmbH, Schaffhausen (CH)

(*) Notice: Subject to any disclaimer, the term of this patent is extended or adjusted under 35 U.S.C. 154(b) by 1609 days.

(21) Appl. No.: 11/624,994

(22) Filed: Jan. 19, 2007

(65) Prior Publication Data

US 2008/0177607 A1    Jul. 24, 2008

(51) Int. Cl.  
*G06Q 10/00* (2012.01)

(52) U.S. Cl.  
USPC ........................................ 705/7.12; 705/7.11

(58) Field of Classification Search  
USPC ................................. 705/7.11–7.72  
See application file for complete search history.

(56) References Cited

U.S. PATENT DOCUMENTS

| | | | |
|---|---|---|---|
| 6,021,402 A * | 2/2000 | Takriti | 705/412 |
| 6,785,592 B1 * | 8/2004 | Smith et al. | 700/291 |
| 7,027,992 B2 * | 4/2006 | Zaccaria et al. | 705/4 |
| 7,274,975 B2 * | 9/2007 | Miller | 700/295 |
| 7,783,390 B2 * | 8/2010 | Miller | 700/291 |
| 7,873,442 B2 * | 1/2011 | Tsui | 700/291 |
| 2002/0169658 A1 * | 11/2002 | Adler | 705/10 |
| 2003/0100974 A1 | 5/2003 | Alvarez et al. | |
| 2003/0126060 A1 | 7/2003 | Lof et al. | |
| 2003/0144864 A1 * | 7/2003 | Mazzarella | 705/1 |
| 2003/0158826 A1 | 8/2003 | Burke et al. | |
| 2004/0128186 A1 * | 7/2004 | Breslin et al. | 705/10 |
| 2005/0197742 A1 | 9/2005 | Scott et al. | |
| 2006/0036448 A1 * | 2/2006 | Haynie et al. | 705/1 |
| 2006/0248118 A1 * | 11/2006 | Curtis et al. | 707/104.1 |
| 2006/0276938 A1 * | 12/2006 | Miller | 700/295 |
| 2007/0276547 A1 * | 11/2007 | Miller | 700/295 |
| 2008/0058969 A1 * | 3/2008 | Nixon et al. | 700/87 |
| 2008/0177605 A1 * | 7/2008 | Zimmerman | 705/7 |
| 2008/0234871 A1 | 9/2008 | Yamada et al. | |
| 2009/0099832 A1 * | 4/2009 | Nasle | 703/18 |
| 2010/0125528 A1 * | 5/2010 | Reddy | 705/317 |
| 2010/0332276 A1 | 12/2010 | Webster | |

OTHER PUBLICATIONS

Rajat K. Deb, Lie-Long Hsue, Richard Albert, and Jason E. Christian "Multi-Market Modeling of Regional Transmission Organization Functions" Mar. 2001 © 2001, Elsevier Science Inc., 1040-6190.*  
Haibin Sun "Integrated Modeling of Electric Power System Operations and Electricity Market Risks With Applications" Georgia Institute of Technology Dec. 2006.*  
Merlin et al: A New Method for Unit Commitment at Electricite De France; IEEE Transactions on Power Apparatus and Systems, vol. PAS-102, No. 5, May 1983; pp. 1218-1225.*  
Takriti, S., Birge, J. R., & Long, E., "A stochastic model for the unit commitment problem," IEEE Transactions on Power Systems, vol. 11, No. 3, pp. 1497-1508, Aug. 1996.*  
Carpentier, P., Cohen, G., & Culioli, J. C., "Stochastic optimization of unit commitment: a new decomposition framework," IEEE Transactions on Power Systems, vol. 11, No. 2, pp. 1067-1073, May 1996.*  
Webster, Andrew S.; U.S. Appl. No. 12/874,422; "Integrated Energy Merchant Value Chain", Date Filed: Sep. 2, 2010.

* cited by examiner

*Primary Examiner* — Lynda A Jasmin

(57) ABSTRACT

Methods and systems for structuring and operating an integrated energy merchant enterprise are provided. Enterprise core value creation functions are first identified. The core value creation functions are those that are primary profit and loss drivers and are generally market facing entities. The core value creation functions are then integrated with one or more integration functions. The integration functions and core value creation functions are controlled with one or more governance functions.

20 Claims, 8 Drawing Sheets

INTEGRATED ENERGY MERCHANT VALUE CHAIN

FIELD OF THE INVENTION

This invention relates generally to energy merchants. More particularly, the invention provides methods and systems for integrating the value chain of an energy merchant.

DESCRIPTION OF RELATED ART

Conventional energy producing enterprises have limited integration between business units that produce energy, through the business units that sell or trade energy. The lack of an effective integrated business model can result in inefficient decisions. A business unit that generates energy may make decisions to optimize the amount of energy produced. The decisions made to optimize the amount of energy produced may negatively impact other business units and the enterprise. For example, an energy generation business unit may be tasked with purchasing fuel to produce energy. The business unit may treat buying fuel as a procurement function and not as a commercial decision. The price risks associated with fuel prices changing over time may result in the energy generation unit purchasing too much or not enough fuel, which will impact other business units. For example, if not enough fuel is purchased by a generation business unit, a trading business unit will have insufficient energy to sell. Similarly, the trading business unit may make decisions that negatively impact the generation business unit. For example, the trading business unit may set risk guidelines that negatively impact the generation business unit.

The lack of an effective integrated business model can also result in the inefficient allocation of resources. The allocation of resources, such as people and capital may be optimized for each business unit instead of the enterprise. For example, a generation business unit may make decisions that result in the business unit acquiring a quantity of fuel at an optimal price for the business unit. The amount of fuel may be more than is necessary to produce the amount of energy that a trading business unit can sell. As a result, resources are allocated to acquire fuel that may not be used because the trading business unit cannot sell the corresponding energy.

Therefore, there is a need in the art for systems and methods that integrate the business units of an energy merchant.

BRIEF SUMMARY OF THE INVENTION

Embodiments of the invention overcome problems and limitations of the prior art by providing systems and methods that integrate the business units of an energy merchant. Core value creation functions, where value is added and destroyed, are first identified. The core value creation functions are integrated by integration functions. The integration functions may increase integration, efficiencies, and standardization among the core value creation functions. One or more governance functions may be tasked with centralizing strategic planning and resource allocation and enhancing risk analysis capability around business activities.

Some embodiments of the invention may include or utilize computer-executable instructions for performing one or more of the disclosed methods. The computer-executable instructions may be stored on a computer-readable medium, such as a portable memory drive or CD-ROM.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
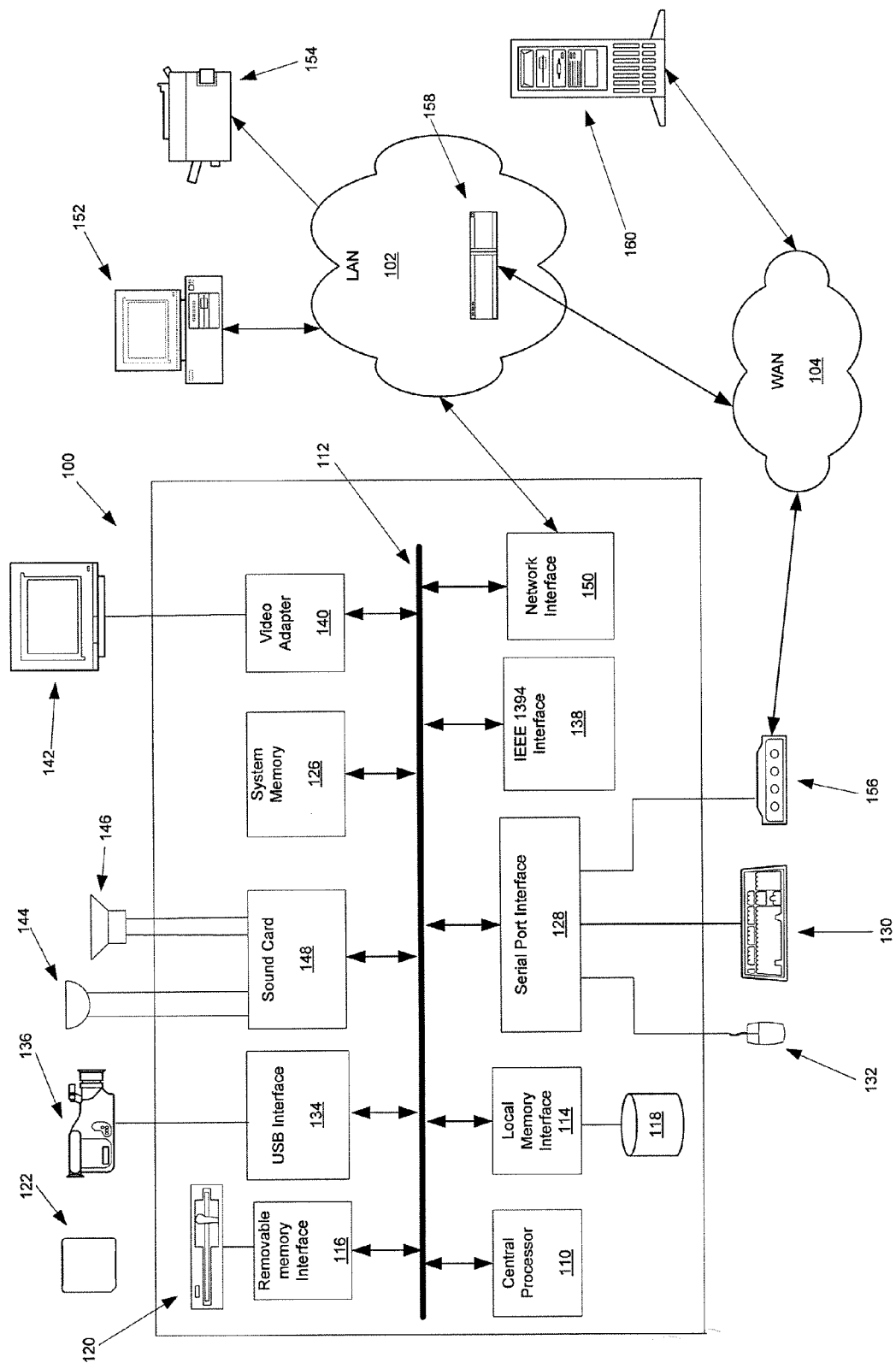
FIG. 1 shows a typical prior art workstation and communication connections.

Various embodiments of the present invention may be implemented with computer devices and systems that exchange and process data. Elements of an exemplary computer system are illustrated in FIG. 1, in which the computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hardwired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may configured to operate with particular manufacture interfaces such as FireWire developed by Apple Computer and i.Link developed by Sony. Peripheral devices may include touch sensitive screens, game pads, scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

The operation of computer 100 and server 160 can be controlled by computer-executable instructions stored on a computer-readable medium. For example, computer 100 may include computer-executable instructions for transmitting information to server 160, receiving information from server 160 and displaying the received information on display device 142. Furthermore, server 160 may include computer-executable instructions for transmitting hypertext markup language (HTML) or extensible markup language (XML) computer code to computer 100.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102, 104, but also a "content network," which is comprised of the data—attributable to a single entity—which resides across all physical networks.

Figure 2:
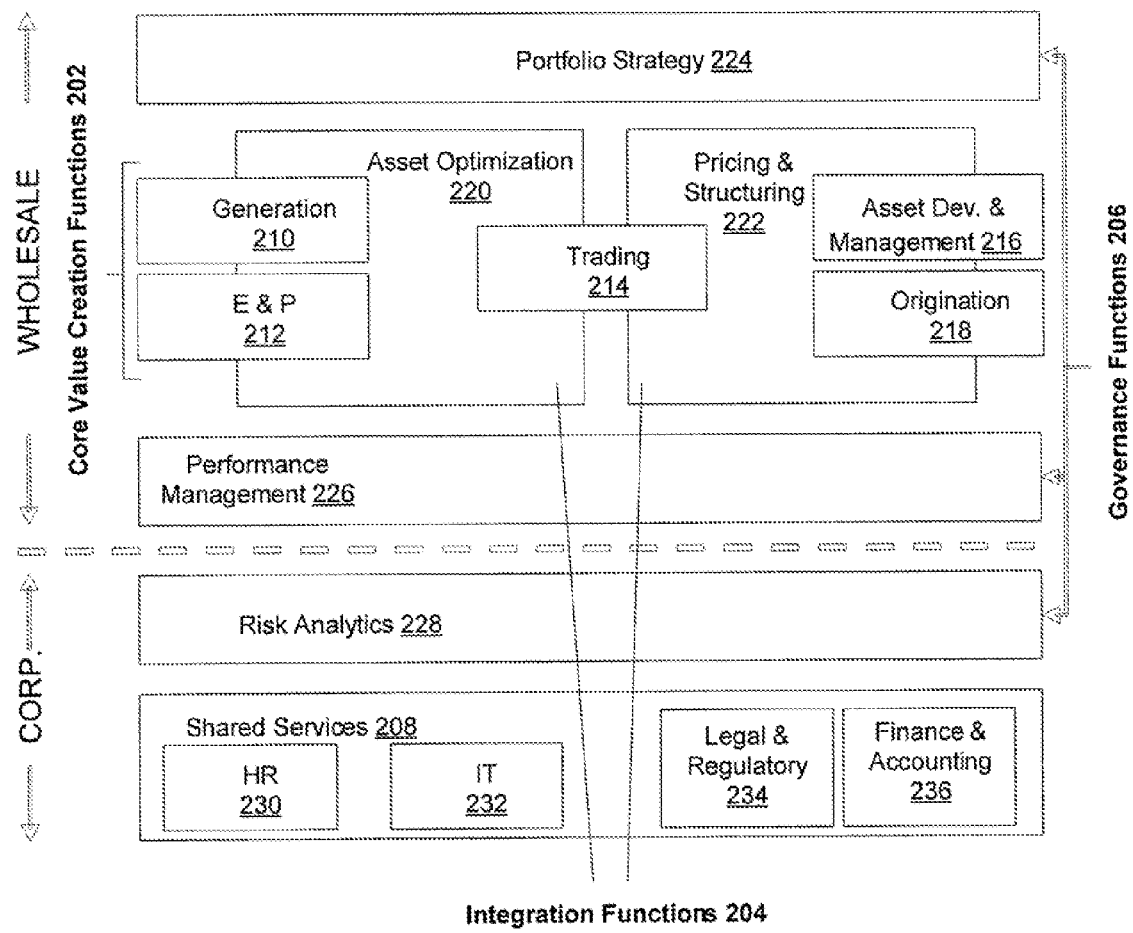
FIG. 2 illustrates an operating model of an integrated energy merchant value chain in accordance with an embodiment of the invention.

FIG. 2 illustrates an operating model 200 of an integrated energy merchant value chain in accordance with an embodiment of the invention. Operating model 200 is divided into core value creation functions 202, integration functions 204, governance functions 206 and shared services 208. Core value creation functions 202 are those that are primary profit and loss drivers and are generally market facing entities. In the example shown, core value creation functions 202 include power generation 210, E&P 212, trading 214, asset development and management 216 and origination 218. Power generation function 210 may be responsible for maximizing production margin. Production margin may be defined by the internal measurements that balance long and short term value while ensuring environmental compliance and safety. E&P function 212 may be tasked with coordinating coal supply needs with an asset optimization function 220 and power generation function 210 to maximize production margin and balance long and short term value while ensuring environmental compliance and safety. Trading function 214 may execute transactions to optimize the intermediate and short term portfolio within corporate risk tolerances. The transactions may involve the sale and/or purchase of electrical power. Asset development and management function 216 may develop and market projects and contracts to maximize long term profits. And, origination function 218 may be tasked with developing and marketing integrated, comprehensive risk mitigation solutions to optimize premium margin capture.

Integration functions 204 may be tasked with clearly defining interfaces consistent with how value is created in the marketplace and increasing integration, efficiencies, and standardization. Integration functions 204 may also optimize value for a utility or other entity above individual functional value. In the example shown in FIG. 2, integration functions 204 include asset optimization function 220 and pricing & structuring function 222. Asset optimization function 220 integrates production functions (power generation 210 and E&P 212) and trading function 214 to optimize the economic management of production assets and load obligations. Pricing & structuring function 222 supports origination function 218 to create and evaluate deals to achieve the risk and return objectives of a business unit or other entity.

Governance functions 206 may be tasked with centralizing strategic planning and resource allocation, enabling streamlined information flows to and from management entities, enhancing risk analysis capability around business activities improving transparency of risk based decisions within the business unit and with a risk management function. Governance functions 206 may also improve alignment of activities with strategic, financial and risk objectives. Governance functions 206 may include a portfolio strategy function 224, a performance management function 226 and a risk measurement and control function 228. Portfolio strategy function 224 may define overall portfolio strategy, align investments and allocate financial and risk capital to both new and existing business activities. Risk analytics function 228 may create a consolidated view of risk exposure across the enterprise and provides front office analytical support to maximize risk adjusted returns. Performance management function 226 may drive the monitoring and reporting of the overall performance against targets and plans.

Shared services 208 include functions that are shared by core value creation functions 202, integration functions 204 and governance functions 206. Shared services may include human resources 230, information technology 232, legal & regulatory 234 and finance & accounting 236.

Integration of business units within the value chain of an energy merchant and the efficient allocation of resources may be obtained by defining roles that will be performed by each of the core value creation functions 202, integration functions 204 and governance functions 206. Defining roles that will not be performed independently by the core value creation functions 202, integration functions 204 and governance functions 206 also facilitates integration and the efficient allocation of resources.

In one embodiment of the invention, power generation function 210 is tasked with: fulfilling environmental requirements, initiating investment decisions, operating generation plants, maintaining generation plants, managing non-fuel supply chains, optimizing plant performance, responding to dispatch instructions and managing production partners. Power generation function 210 will not independently: assume price risk, make asset investments, make dispatch decisions, acquire assets or divest assets.

Trading function 214 is tasked with: developing short-term tactical trading plans, developing long-term trading plans, developing market viewpoints, executing trading strategies, developing trading hedge strategies for originated positions and assets, executing trading hedge strategies, generating dispatch instructions, interact with portfolio strategy function 224 and executing fuel contracts. Trading function 214 will not independently: make short term dispatch decisions, set risk guidelines, acquire or divest assets or determine dispatch instructions. Trading function 214 may also be responsible for interacting with counterparties, but not customers.

Origination function 218 is tasked with: developing marketing strategies and plans, originating load, supply and services, managing deals, measuring origination performance, managing origination customers and originating long-term fuel contracts. Origination function 218 will not independently: acquire or divest assets, enter new markets, regions or customer segments or make final pricing decisions.

E & P function 212 is tasked with: fulfilling environmental and safety requirements, optimizing on-site coal mining activities, initiating investment and expense requests, maintaining mining equipment, responding to mining instructions and managing mining partners and contractors. E & P will not independently: assume price risk, procure fuels, make asset investments, make dispatch decisions, acquire assets or divest assets.

Asset development and management function 216 is tasked with: developing asset development strategies and plans and managing engineering, procurement and development processes. Asset development and management function 216 will not independently: acquire assets, divest assets, enter new markets, enter new regions, enter new customer segments or make final pricing decisions.

Asset optimization function 220 is tasked with: managing environmental positions, developing asset production plans, developing forecasts, developing short-term production plans, managing fuel, dispatching and monitoring production, optimizing commercial operations, optimizing maintenance plans and shedding market price risk to trading. Asset optimization function 220 will not independently: acquire assets, divest assets, make investment decisions, schedule outages, schedule maintenance or make dispatch decisions.

Pricing & structuring function 222 is tasked with: optimizing models, conducting analyses, developing contract forecasts, developing standard products, pricing commodities, structuring deals, evaluating structuring options, incorporating standards, limits and requirements from risk analytics function 228, incorporating standards, limits and requirements from finance related organizations and identifying opportunities to optimize credit exposures. Pricing & structuring function 222 will not independently: determine final pricing for transactions or acquire, sell, or trade gas or power. Pricing & structuring function 222 may also be prohibited from interacting on behalf of one business unit or organizational area. For example, pricing & structuring function 222 could not act on behalf of trading function 214 in a dispute between trading function 214 and origination function 218.

Figure 3:
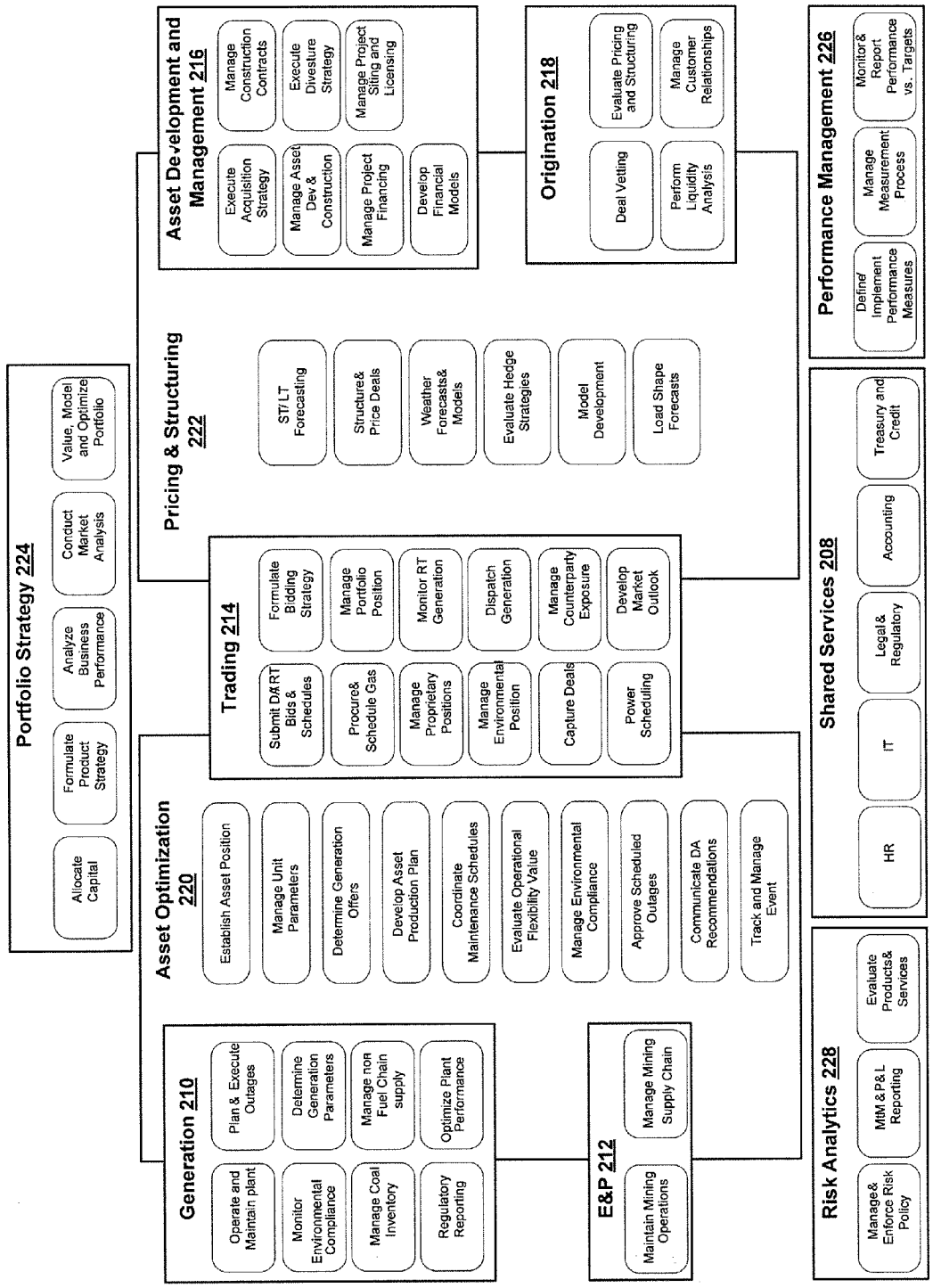
FIG. 3 illustrates exemplary functions performed by core value creation functions, integration functions, governance functions and shared services in accordance with an embodiment of the invention.

FIG. 3 illustrates exemplary functions performed by core value creation functions 202, integration functions 204, governance functions 206 and shared services 208 in accordance with an embodiment of the invention. One skilled in the art will appreciate that the functions shown are exemplary and that additional and/or alternative functions may also be included.

Figure 4:
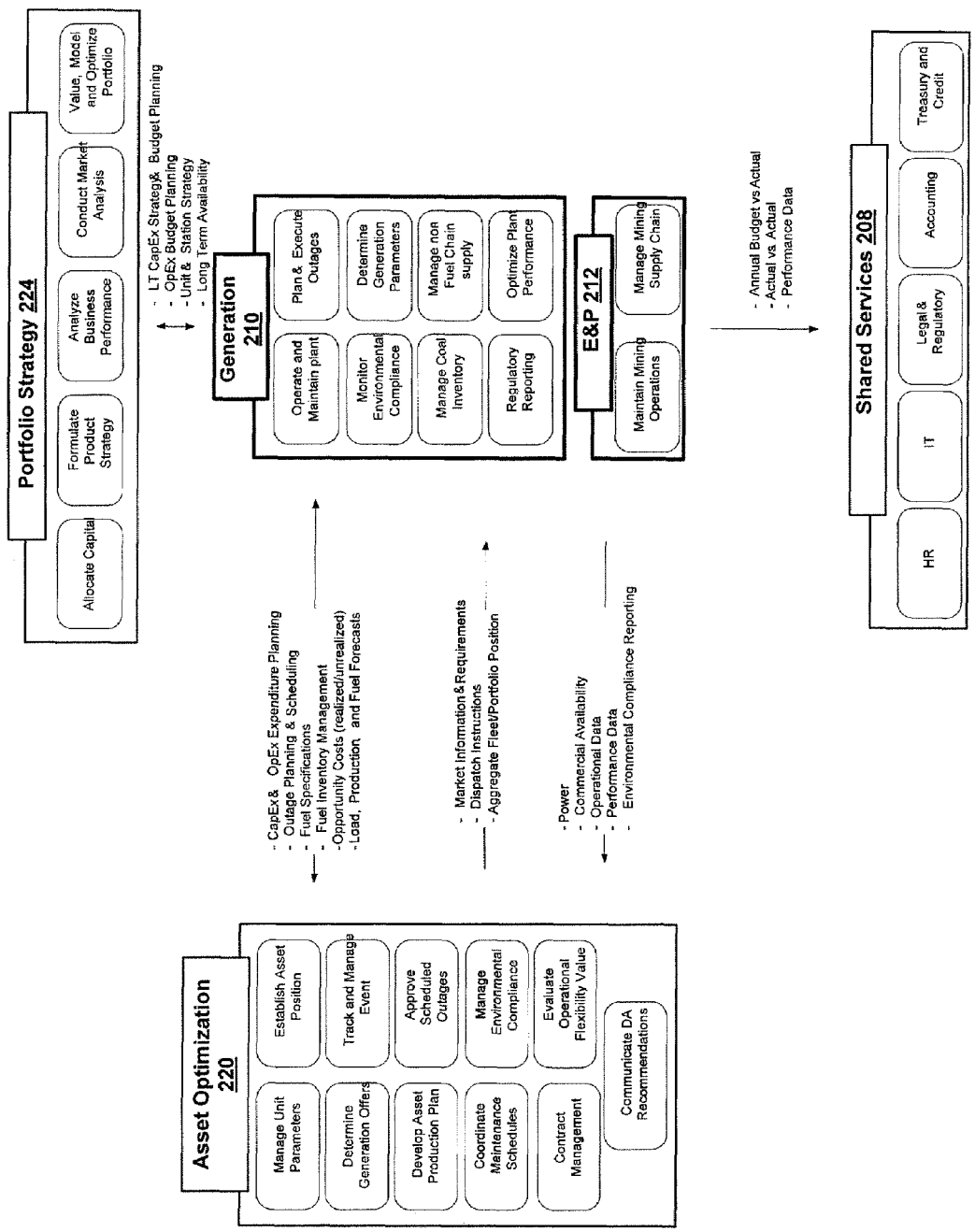
FIG. 4 illustrates the exchange of information between a generation function and other functions, in accordance with an embodiment of the invention.

FIG. 4 illustrates the exchange of information between generation function 210 and other functions, in accordance with an embodiment of the invention. Generation function 210 and E&P function 212 provide information such as plant availability, potential operational risk and dispatch instructions. Generation function 210 and E&P function 212 may initiate asset investment opportunities within the existing production portfolio and provide availability data to asset optimization function 220. Generation function 210 and asset optimization function 220 can also develop outage schedules, capital expenditures, and operation and maintenance requirements. Generation function 210 and E&P function 212 will execute production plans and operating instructions and operate plants in accordance with environmental and safety requirements.

Figure 5:
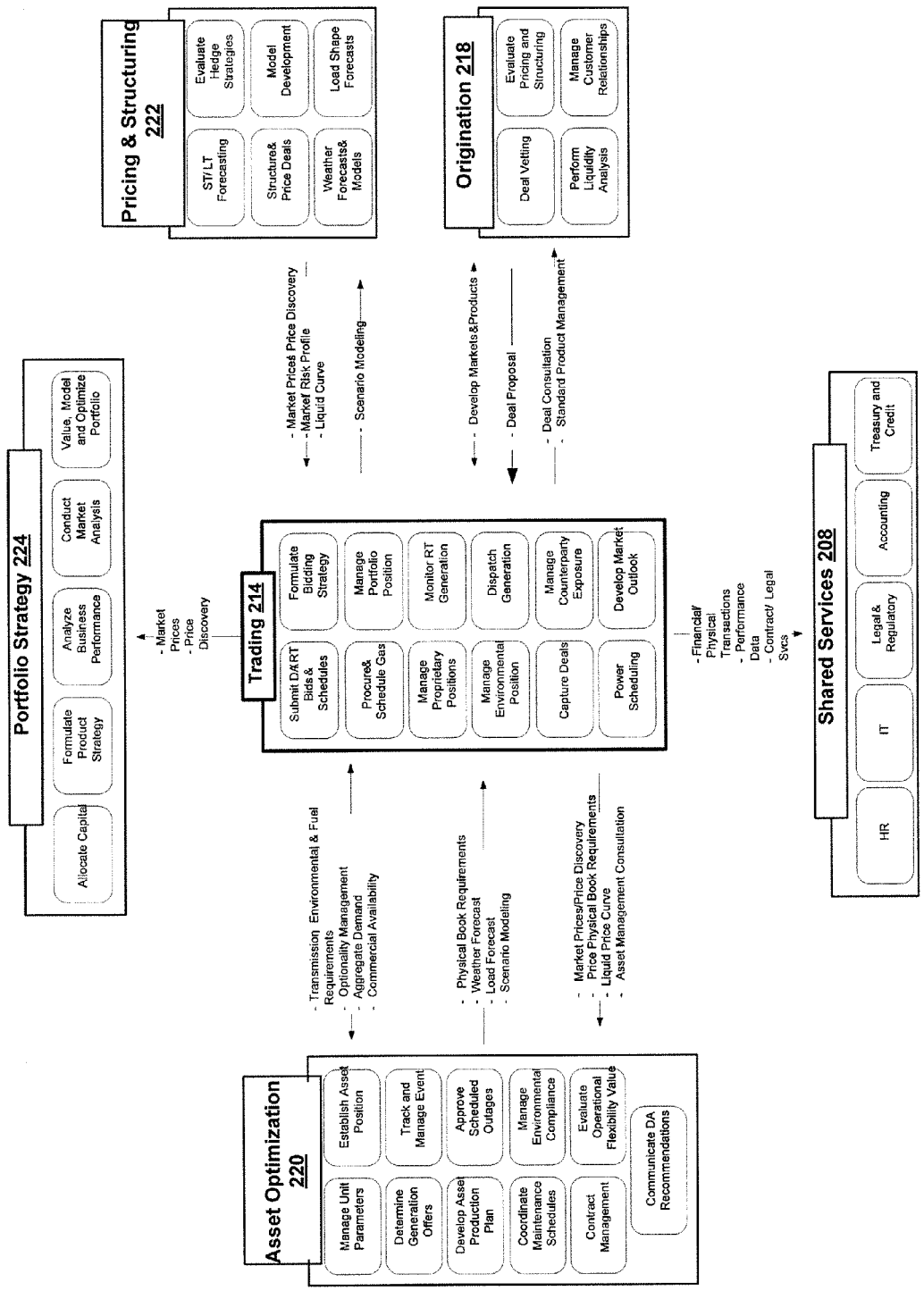
FIG. 5 illustrates the exchange of information between a trading function and other functions, in accordance with an embodiment of the invention.

FIG. 5 illustrates the exchange of information between trading function 214 and other functions, in accordance with an embodiment of the invention. Trading function 214 exchanges information involving positions, market data and forecasts. Trading function 214 manages financial books and price risk and obtains risk capital from the enterprise to effectively assume and manage price risk exposures. Trading function 214 creates and exchanges information with portfolio strategy function 224 relating to strategic goals. Trading function 214 may also develop optimization strategies based on risk information received from pricing and structuring function 222.

Figure 6:
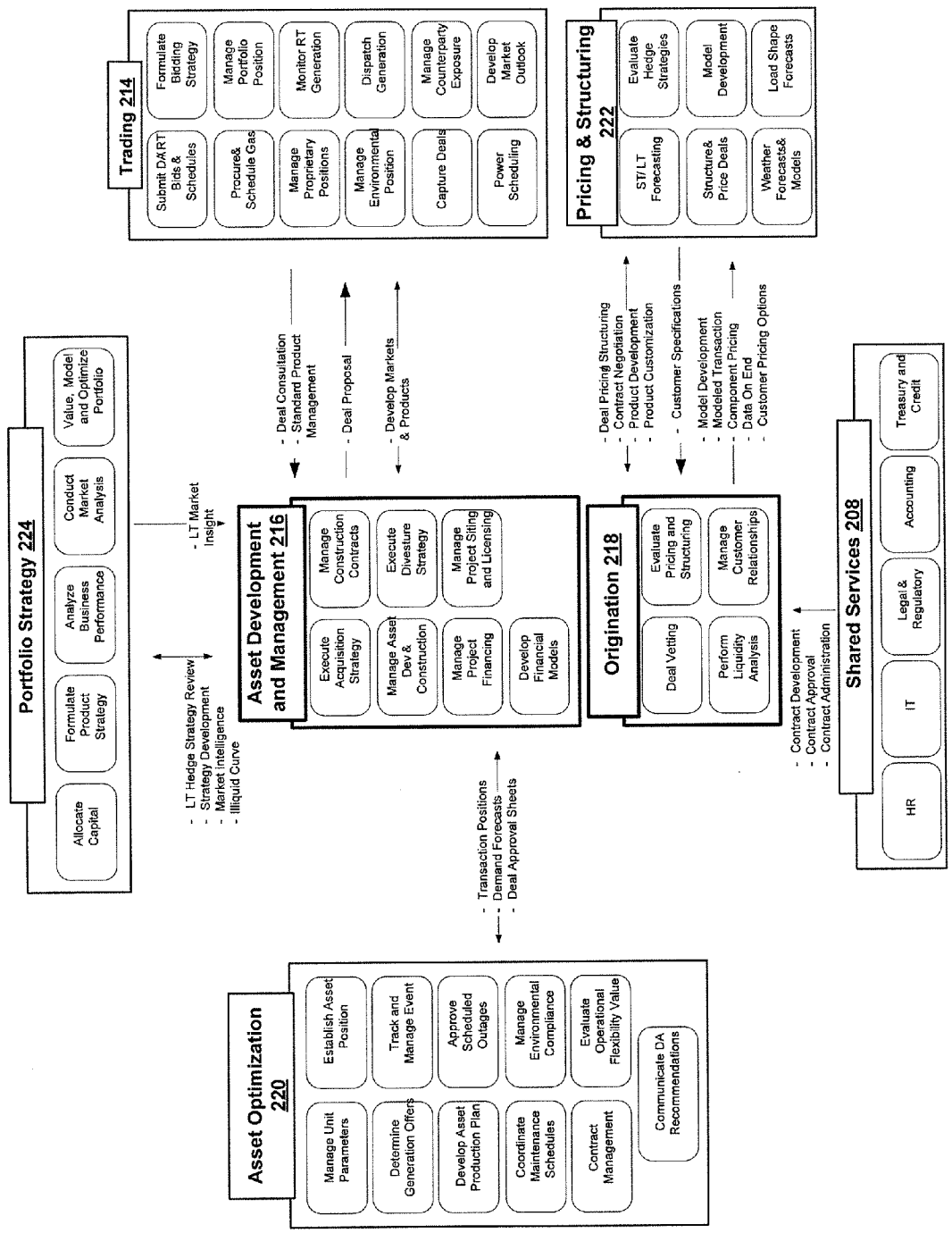
FIG. 6 illustrates the exchange of information between an asset development and management function and other functions, in accordance with an embodiment of the invention.

FIG. 6 illustrates the exchange of information between asset development and management function 216 and other functions, in accordance with an embodiment of the invention. Asset development and management function 216 exchanges information relating to equity amounts and resource commitments. Asset development and management function 216 also exchanges information to align market planning with strategic plans provided by portfolio strategy function 224. Origination function 218 receives information regarding contracts from shared services function 208 and exchanges model information with price and structuring function 222.

Figure 7:
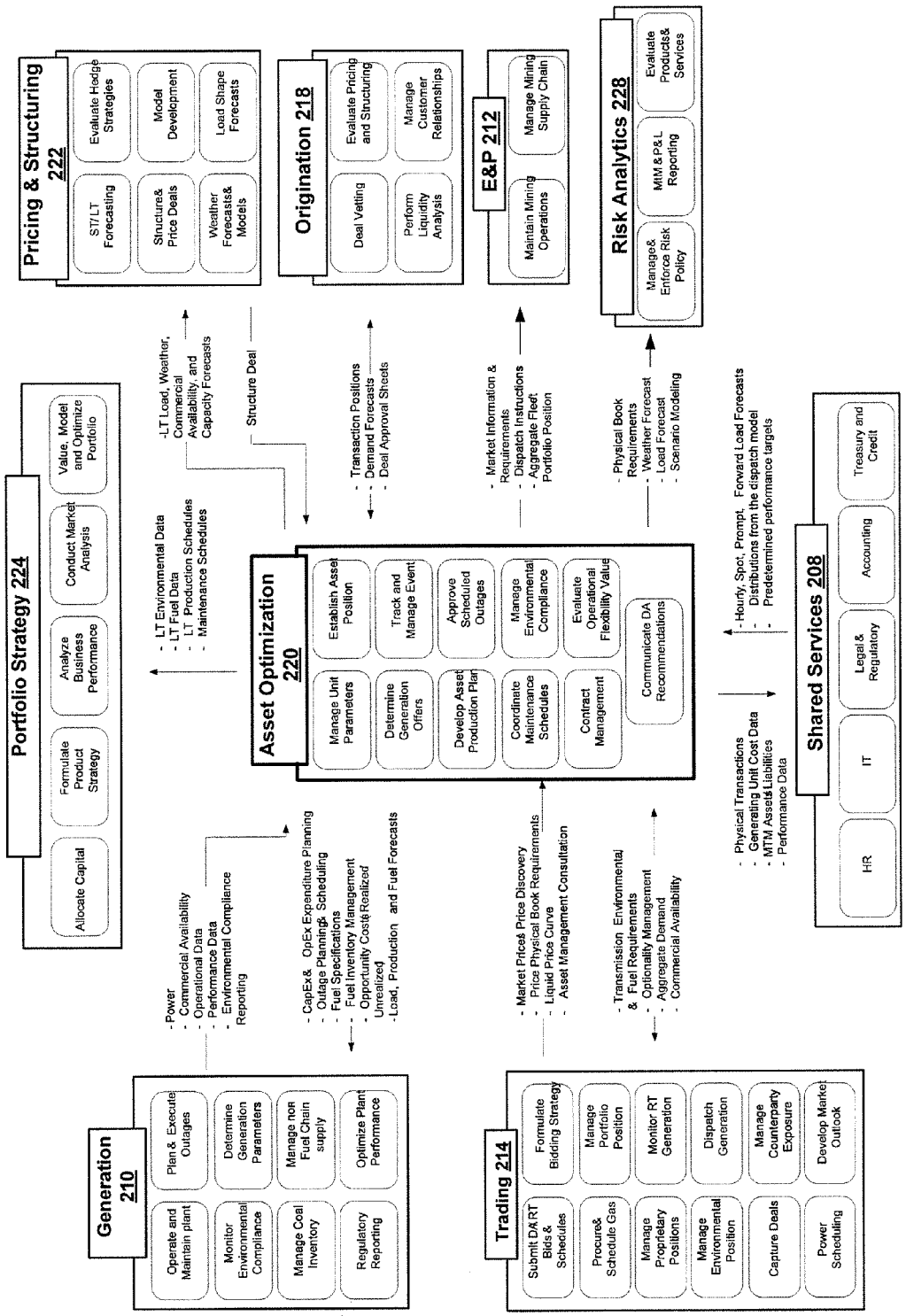
FIG. 7 illustrates the exchange of information between an asset optimization function and other functions, in accordance with an embodiment of the invention.

FIG. 7 illustrates the exchange of information between asset optimization function 220 and other functions, in accordance with an embodiment of the invention. Asset optimization function 220 exchanges information with generation function 210 and trading function 214 such that generation function 210 is viewed as a supplier and trading function 214 is viewed as a customer. Asset optimization function 220 also provides forecast data to risk analytics function 228 and pricing and structuring function 222. Transaction positions, demand forecasting and deal approval sheets are exchanged with origination function 218.

Figure 8:
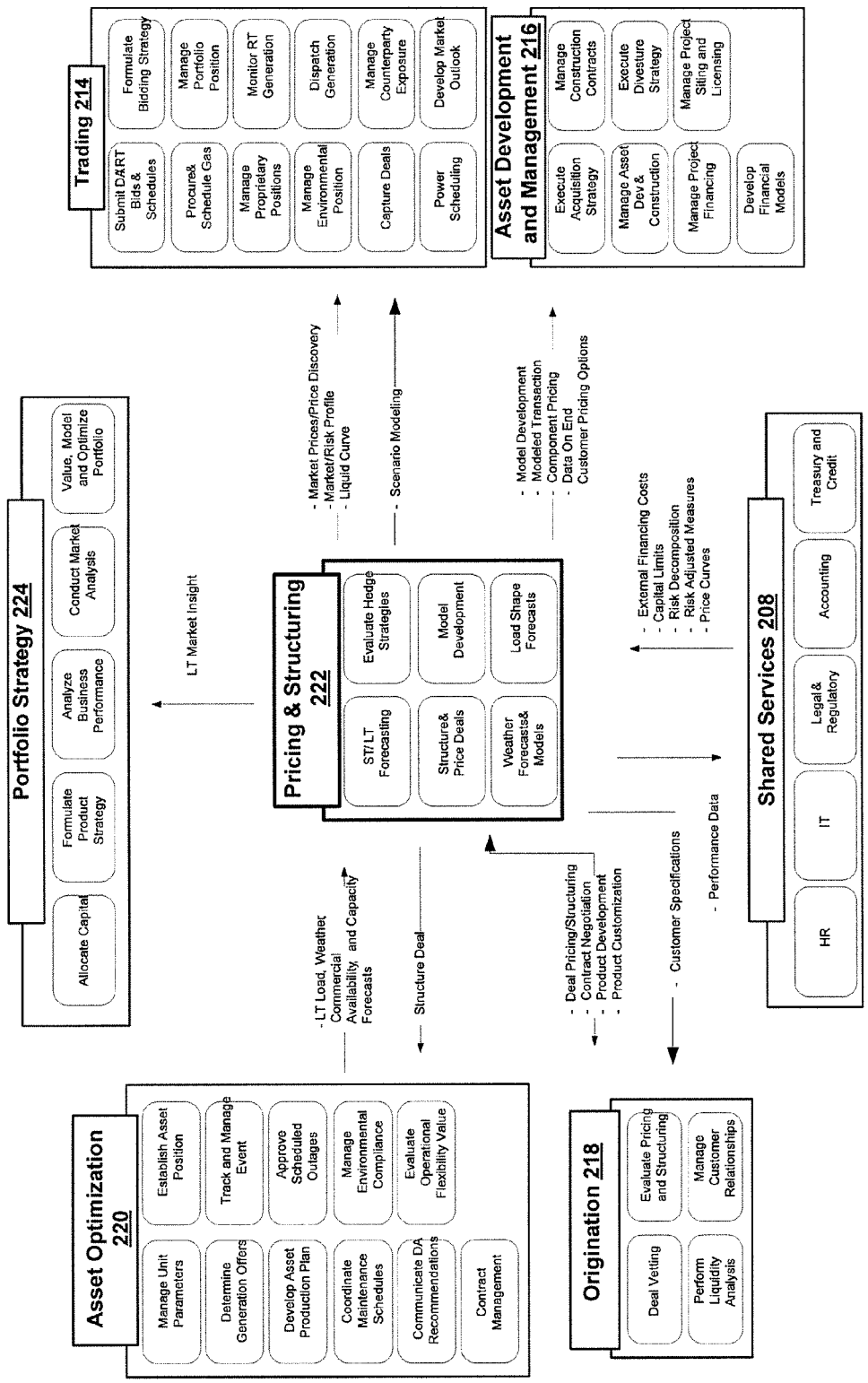
FIG. 8 illustrates the exchange of information between a pricing and structuring function and other functions, in accordance with an embodiment of the invention.

FIG. 8 illustrates the exchange of information between pricing and structuring function 222 and other functions, in accordance with an embodiment of the invention. Pricing and structuring function 222 interacts with origination function 218, trading function 214, and portfolio strategy function 224 to create and value transactions. Pricing and structuring function 222 also provides risk related information and analysis to other functions. The information flow shown in FIG. 8 is structured such that pricing and structuring function 222 is allowed to objectively and fairly represent both internal sides of a transaction.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

I claim:

1. A computer implemented method comprising:
   integrating by a computer a power generation function and a trading function with an asset optimization function, wherein the power generation function and trading function are core value creation functions of an energy merchant enterprise comprising a plurality of business units, wherein the power generation function plans and executes an outage of a power generation plant and the asset optimization function approves the outage of the power generation plant;
   integrating by the computer the trading function and an origination function with a price and structuring function, wherein the origination function is a core value creation function of the energy merchant enterprise; and
   controlling by the computer the asset optimization and the price and structuring functions with a performance management function.

2. The computer implemented method of claim 1, further comprising:
   integrating by the computer the trading function and an asset development and management function with the price and structuring function, wherein the asset development and management function is a core value creation function of the energy merchant enterprise.

3. The computer implemented method of claim 2, further comprising:
   defining by the computer roles that will not be performed independently by the core value creation functions.

4. The computer implemented method of claim 3, wherein the defining comprises not allowing the power generation function to independently assume price risks.

5. The computer implemented method of claim 3, wherein the defining comprises not allowing the power generation function to independently make asset investments.

6. The computer implemented method of claim 1, further comprising:
   defining by the computer that the asset optimization function will not independently schedule an outage.

7. The computer implemented method of claim 1, further comprising:
   defining by the computer that the asset optimization function will not independently schedule maintenance.

8. The computer implemented method of claim 1, further comprising:
   defining by the computer that the asset optimization function will not independently acquire an asset.

9. The computer implemented method of claim 1, further comprising:
   defining by the computer that the asset optimization function will not independently divest an asset.

10. The computer implemented method of claim 1, further comprising:
    defining by the computer that the trading function will not independently acquire an asset.

11. A computer implemented method comprising:
    integrating by a computer a power generation function and a trading function with an asset optimization function, wherein the power generation function and trading function are core value creation functions of an energy merchant enterprise comprising a plurality of business units, wherein the power generation function plans and executes an outage of a power generation plant and the asset optimization function approves the outage of the power generation plant;
    integrating by the computer the trading function and an origination function with a price and structuring function, wherein the origination function is a core value creation function of the energy merchant enterprise and the origination function will not independently acquire an asset; and
    controlling by the computer the asset optimization and the price and structuring functions with a performance management function.

12. The computer implemented method of claim 11, further comprising:
    defining roles that will not be performed independently by the core value creation functions.

13. The computer implemented method of claim 11, further comprising:
    defining by the computer that the trading function will not independently acquire an asset.

14. The computer implemented method of claim 11, further comprising:
    defining by the computer that the trading function will not independently divest an asset.

15. The computer implemented method of claim 11, further comprising:
    defining by the computer that the power generation function will not independently make an asset investment.

16. The computer implemented method of claim 11, further comprising:
    defining by the computer that the power generation function not independently make a dispatch decision.

17. The computer implemented method of claim 11, further comprising:
    defining by the computer that the asset optimization function will not independently schedule an outage.

18. The computer implemented method of claim 11, further comprising:
    defining by the computer that the asset optimization function not independently schedule maintenance.

19. The computer implemented method of claim 11, further comprising:
    defining by the computer that the trading function will not independently determine a dispatch instruction.

20. The computer implemented method of claim 11, wherein the trading function does not interact with a customer.

* * * * *

UNITED STATES PATENT AND TRADEMARK OFFICE
CERTIFICATE OF CORRECTION

PATENT NO. : 8,650,057 B2  
APPLICATION NO. : 11/624994  
DATED : February 11, 2014  
INVENTOR(S) : Andrew S. Webster Page 1 of 1

It is certified that error appears in the above-identified patent and that said Letters Patent is hereby corrected as shown below:

<u>On the Title Page</u>

Item (73) Assignee, delete "GmbH" and insert --Limited--

Item (73) Assignee, delete "Schauffhausen (CH)" and insert --Dublin (IE)--

Signed and Sealed this  
Twentieth Day of October, 2015

Michelle K. Lee  
*Director of the United States Patent and Trademark Office*